United States Patent [19]

McGuire

[11] 4,010,328
[45] Mar. 1, 1977

[54] OUT-OF-BAND SIGNALING METHOD AND APPARATUS TO ADAPT PAYPHONES TO TELEPHONE SYSTEMS

[75] Inventor: Ronald F. McGuire, Fairfax, Va.

[73] Assignee: The Anaconda Company, New York, N.Y.

[22] Filed: June 13, 1975

[21] Appl. No.: 586,733

[52] U.S. Cl. .................. 179/81 R; 179/84 VF; 179/6.3 R
[51] Int. Cl.² .................. H04M 1/00; H04M 17/02
[58] Field of Search ......... 179/84 VF, 2.5 R, 6.3 R, 179/6.4, 6.5, 84 R, 81 R, 17 C

[56] References Cited
UNITED STATES PATENTS

| | | | |
|---|---|---|---|
| 2,971,062 | 2/1961 | Salihi | 179/84 VF |
| 3,061,783 | 10/1962 | Noller | 179/84 VF |
| 3,306,984 | 2/1967 | Leonard | 179/84 VF |
| 3,349,191 | 10/1967 | Mann | 179/84 VF |
| 3,428,757 | 2/1969 | Roscoe | 179/84 VF |
| 3,519,758 | 7/1970 | Gfeller | 179/84 VF |
| 3,886,321 | 5/1975 | Krasin | 179/84 R |

Primary Examiner—Kathleen H. Claffy
Assistant Examiner—Joseph Popek
Attorney, Agent, or Firm—William W. Haefliger

[57] ABSTRACT

An out-of-band signaling method and apparatus are provided to facilitate the adaptation of payphones to telephone systems, as for example subscriber carrier systems. Part of the speech band is made unavailable to the subscribers and is employed for signaling DC line conditions from one end of the telephone system to the other.

17 Claims, 3 Drawing Figures

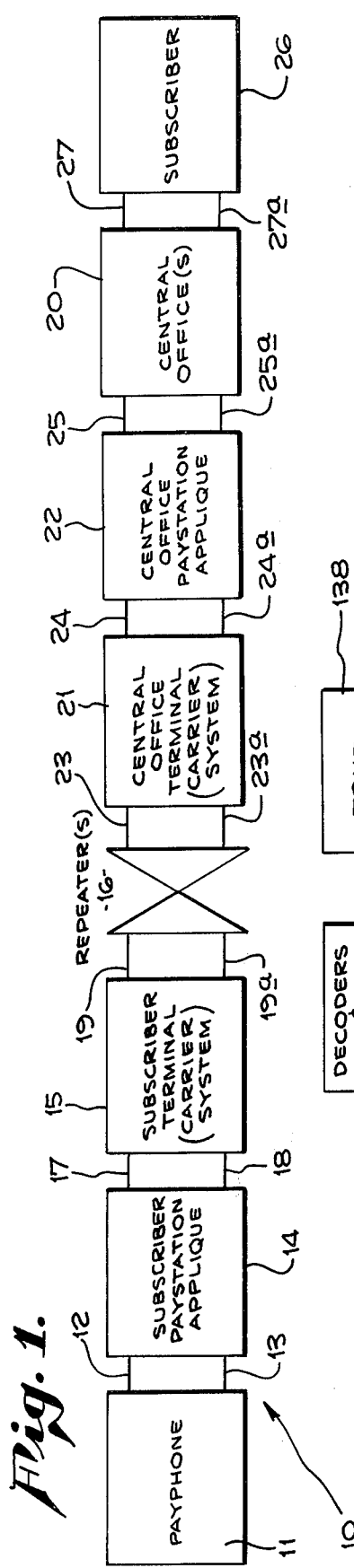
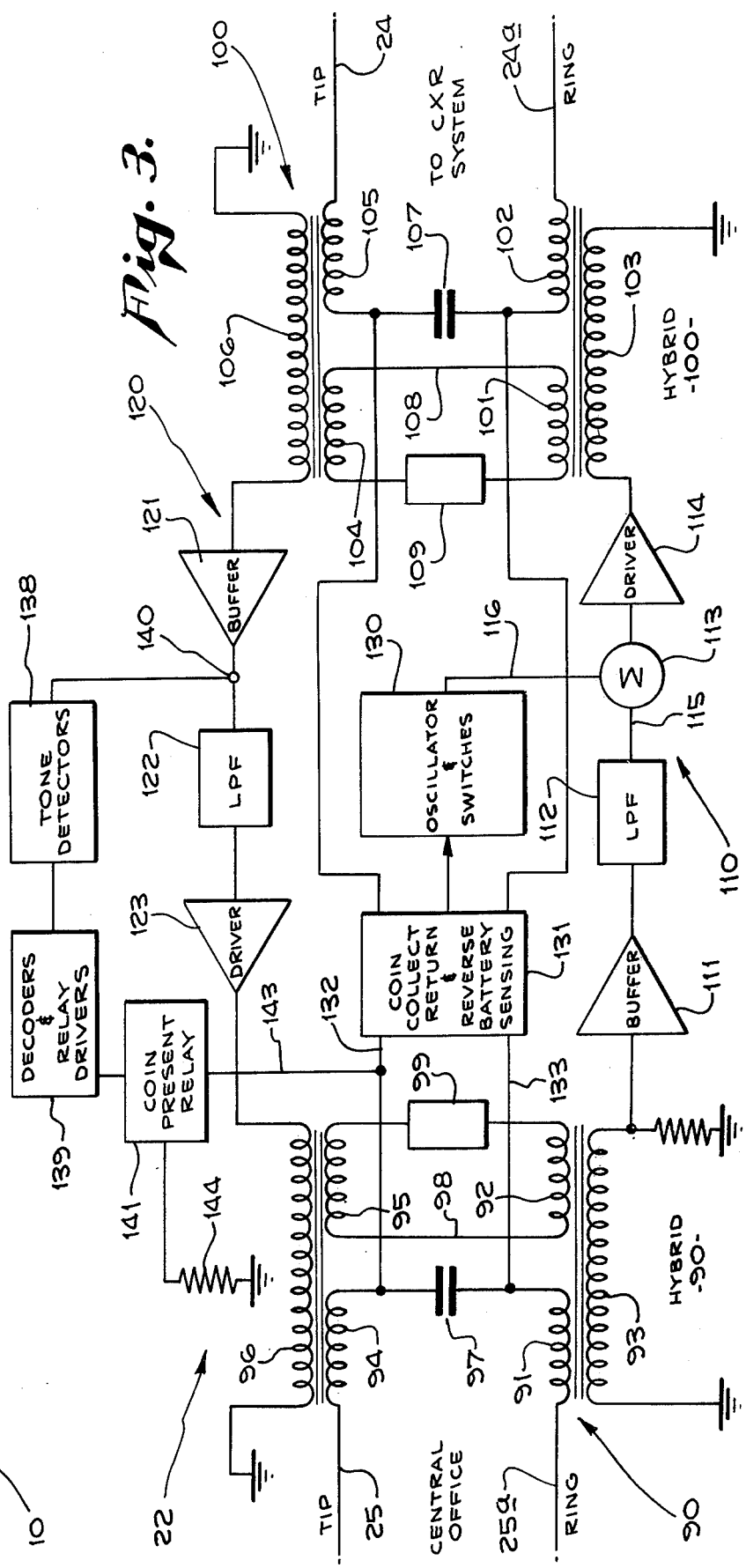

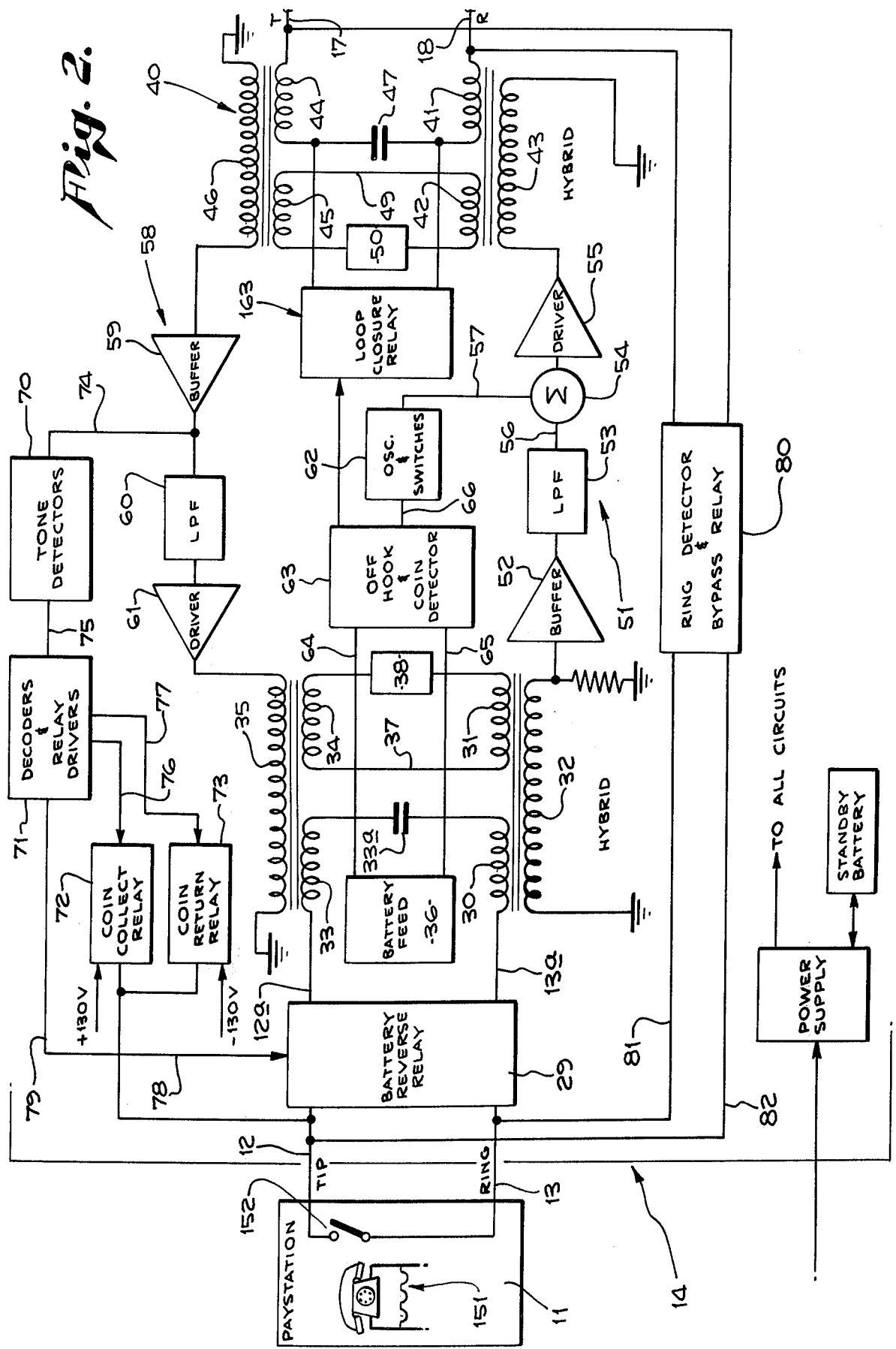

OUT-OF-BAND SIGNALING METHOD AND APPARATUS TO ADAPT PAYPHONES TO TELEPHONE SYSTEMS

BACKGROUND OF THE INVENTION

This invention relates generally to subscriber carrier telephone systems, and more particularly concerns the adaptation of payphones to such systems.

Typical telephone carrier systems provide for frequency responses of from 200 to 3000Hz, thereby requiring all signaling to be accomplished by AC signaling methods. The use of inband signaling tones presents several inherent problems, among which are false signaling due to voice energy and user distraction due to auditory perception of the signaling tones. Typical signals include coin collect, coin return, coin present, dial tone, off-hook indication and ringing. Accordingly, the use of inband signaling has been considered as undesirable.

SUMMARY OF THE INVENTION

It is a major object of the invention to provide out-of-band signaling method and apparatus to facilitate the adaptation of payphones to subscriber carrier telephone systems. The invention is predicated on the concept of using part of the speech band (which would otherwise be available to the subscribers) for signaling DC line conditions from one end of the carrier to the other, in both directions. The signaling frequencies are not available to the subscribers because the additional DC line conditions, used with payphones, cannot normally be transmitted through a carrier system. For example, if the carrier system has a speech band of 300 to 3000Hz, the band 300 to 2800Hz could be made available to subscribers, and the frequencies 2915 to 3000Hz could be used for signaling DC line conditions such as coin present, coin return, coin collect and line reversal at the central office.

Basically, the invention involves the use of a bidirectional VF repeater employing hybrid transformers for loop isolation and stability and low pass filters to limit the passband. Such a typical carrier channel may have 3000Hz response, and a 200Hz signaling band above the customer voice passband, so that AC signaling tones can be transmitted. As an example, subscriber terminal applique circuitry for adapting a subscriber carrier telephone system to operate with a paystation may comprise:

a. a first hybrid transformer connectible with the paystation, b. a second hybrid transformer connectible with the subscriber carrier telephone system, c. a voice frequency transmit branch connected between certain coils of said first and second transformers, and including a first low pass filter to limit transmit voice frequencies to a selected band with an upper cut-off frequency $f_1$, d. a voice frequency receive branch connected between other coils of said first and second transformers and including a second low pass filter, and e. signaling circuitry connected between said first transformer and said first branch at a location between said first filter and said second hybrid transformer to transmit signal tones above $f_1$.

In similar manner, central office circuitry for adapting a subscriber carrier telephone system to operate with a paystation may comprise:

a. a primary hybrid transformer connectible with the central office to which a subscriber terminal is remotely connected, b. a secondary hybrid transformer connectible with a central office terminal to which the paystation is remotely connected, c. a voice frequency transmit branch connected between certain coils of said transformers, and including a primary low pass filter to limit transmit voice frequencies to a selected band with an upper cut-off frequency $f_1$, d. a voice frequency receive branch connected between other coils of said transformers and including a secondary low-pass filter, and e. signaling circuitry connected between said primary transformer and said first branch at a location between the primary filter and the secondary transformer to transmit signal tones above $f_1$.

Such appliques, details of which will be described, enable the use of payphones on all types of carrier systems as well as providing greatly extended range capabilities over normal wire facilities.

These and other objects and advantages of the invention, as well as the details of an illustrative embodiment will be more fully understood from the following description and drawings, in which:

DRAWING DESCRIPTION

FIG. 1 is a system block diagram;

FIG. 2 is a block diagram showing subscriber terminal circuitry; and

FIG. 3 is a block diagram showing central office terminal circuitry.

DETAILED DESCRIPTION

Referring first to FIG. 1, the system 10 includes a payphone 11 connected via dual wires 12 and 13 with the subscriber paystation applique circuitry 14. The latter is connected via the subscriber terminal carrier system 15 with repeaters 16, connecting wires being shown at 17, 18, 19 and 19a. The repeaters are connected with the central office 20 via the central office terminal carrier system 21 and paystation applique 22, connections being shown at 23, 23a, 24, 24a, 25 and 25a. A subscriber unit 26 is also shown as connected at 27 and 27a with the central office.

Referring now to FIG. 2, the elements of the circuitry 14 are shown. A first hybrid transformer 28 is connected with the paystation 11 via a reversing relay 29 having a first state in which lines 12 and 12a are connected and lines 13 and 13a are connected, and a reversed state in which lines 12 and 13a are connected and lines 13 and 12a are connected. The hybrid includes a first set of inductively coupled coils 30, 31 and 32, and a second set of inductively coupled coils 33–35. Lines 12a and 13a are series connected via coils 30, 32 and capacitor 33a a battery 36 connected across the capacitor serving to supply loop current to the payphone. Accordingly, the relay 29 serves to reverse the polarity of the tip and ring connections to the payphone. Coils 31 and 34 are interconnected in a loop via a leg 37 and a balancing network 38, the latter serving to balance signal currents in the hybrid 28.

A second hybrid transformer is designated at 40 and includes a first set of inductively coupled coils 41–43, and a second set of inductively coupled coils 44–46. Tip and ring lines 17 and 18 are series connected via coils 41, 44 and capacitor 47, and coils 42–45 are interconnected in a loop via a leg 49 and a balancing network 50.

A transmit branch 51 for voice frequencies is connected between certain coils (such as coils 32 and 43) of the two hybrids, that branch including a buffer amplifier 52, a first low pass filter 53, a summing amplifier or junction 54 and a driver amplifier 55. The opposite ends of the coils are terminated at ground, as shown. Buffer amplifier 52 provides impedance matching between the hybrids and the low-pass filter 53, the latter serving to limit transmit frequencies to a selected band the upper limit of which is $f_1$, such that the tones at the payphone will not cause false signaling tones to be transmitted. In this regard, $f_1$ may be about 2800Hz, to provide highly advantageous results. Summing amplifier or junction 54 sums the voice frequencies from the payphone transmitted on line 56 with the signaling tones transmitted on line 57, while the driver amplifier 55 receives the output from 54 and provides proper output impedance and power gain required to transmit both voice and signaling input to the carrier terminal via coils 43 and 41.

A voice frequency receive branch 58 is connected between other coils (such as coils 46 and 35) of the two hybrids, the branch including a buffer amplifier 59, a second low pass filter 60, and a driver amplifier 61. The opposite ends of coils 46 and 35 are also terminated at ground, as shown. Filter 60 also transmits voice frequencies up to $f_1$ to the paystation, but attenuates higher frequencies, preventing signalling tones from being heard at the payphone. Driver amplifier 61 provides proper output impedance and power gain necessary to transmit voice signals through hybrid 28 to the payphone. In this regard, hybrid 40 provides a low-loss path from driver amplifier 55 to the subscriber carrier terminal 18, but attenuates transmission of such signals to the buffer amplifier 59, so the "singing" will not occur.

Signaling circuitry is connected between the first hybrid transformer 28 and the first branch 51, (i.e. typically at 54) to transmit signal tones above $f_1$ within the selected band. For example, an oscillator 62 may be electrically connected via off-hook and coin detector 63, and leads 64–66, with the loop that includes coils 30 and 32 to respond to a coin deposit produced signal in that loop by producing an oscillatory signal $f_2$ greater than $f_1$. That signal or tone $f_2$ is transmitted to the carrier system via elements 54, 55, 43 and 41, to modulate the carrier, as will be further explained.

The subscriber terminal applique circuitry also includes means such as elements 70 and 71 connected with the receive branch 58 at the input side of filter 60 to detect signal tones transmitted from the subscriber carrier telephone system, together with coin collect and return relays 72 and 73 to be selectively activated by different detected tone levels. The relays are thus selectively operable to supply predetermined voltage to the tip lead 12 connected with the paystation. In this regard, tone detector element 70 may have its input connected at 74 with the input side of filter 60 and operates to provide appropriate DC outputs to indicate the presence or absence of signaling tones. The decoders and relay drivers 71 may have input connected at 75 with the output of detectors 70, and provide output at 76 and 77 to the relays. The latter are in turn connected at 78 with the lead 12 to supply predetermined voltage (as for example ±130 volts) thereto. Another output from the element 71 is shown connected at 79 to the battery reversing relay, to effect reversing thereof for purposes to be described.

Also shown in FIG. 1 is a ring detector operated by-pass relay 80 electrically connected between the input side of the transformer 28 and the output side of the transformer 40. The detector-relay functions to by-pass the applique circuitry in response to ring signaling detection; i.e., when the presence of "ring" signal applied to leads 18 is detected, the relay is activated to directly connect leads 12 and 13 with leads 17 and 18, respectively, as via connecting leads 81 and 82.

Referring next to FIG. 3, the central office paystation applique 22 is shown in detail. A primary hybrid transformer 90 includes first and second sets of coils 91–93 and 94–96, each set being inductively coupled. Coils 94 and 91 are respectively connected in series via a capacitor 97 and also with the central office 20 via leads 25 and 25a. Coils 92 and 95 are connected in a loop via leg 98 and balancing network 99.

A secondary hybrid transformer 100 also includes first and second sets of inductively coupled coils 101–103 and 104–106. Tip and ring leads 24 and 24a are series connected via coils 105, 102 and capacitor 107, whereas coils 101 and 104 are series connected via leg 108 and balancing network 109.

A voice frequency transmit branch 110 is connected between coils 93 and 103, the opposite ends of the latter being terminated at ground. Branch 110 includes buffer amplifier 111, primary low pass amplifier 112, summing junction or amplifier 113, and driver amplifier 114. Buffer 111 provides impedance matching between the hybrids and the low pass filter; and filter 112 allows voice frequencies up to $f_1$ to be transmitted, and attenuates high frequencies, so that tones originating in the subscriber's line will not cause false signaling. Summing amplifier 113 sums the voice frequencies at its input 115 with signaling tones on its input 116, for transmission to the carrier system; and driver 114 provides proper output impedance and power gain to transmit the voice and signaling frequencies to the carrier system. Hybrids 90 and 100 provide isolation between the transmit and receive branches so that singing will not occur. In this regard, hybrid 100 provides a low loss transmission path from amplifier 114 to the tip and ring leads 24 and 24a to the carrier system, but attenuates signals to the voice frequency receive path 120 (to be described). Balance networks 99 and 109 divide the signaling currents in the hybrids in such manner as to aid such attenuation.

The path or branch 120 includes buffer amplifier 121, low-pass filter 122, and driver amplifier 123, connected in series between coils 106 and 96, the opposite end terminals of the latter being grounded as shown. Filter 122 passes voice frequencies up to $f_1$ and attenuates higher frequencies, thereby preventing transmission of signaling tones to the central office and annoying subscribers using the circuit. Driver 123 provides proper output impedance and power gain to transmit the voice frequencies to the subscriber. Hybrid 90 provides a low loss transmission path from the driver 123 to the tip and ring leads 25 and 25a to the central office (20), but attenuates signal transmission from the driver 123 to buffer 111, so that singing will not occur.

Signaling means is connected between the hybrid 90 and the primary branch 110 (i.e. typically at 113) to transmit signal tones above $f_1$. For example, an oscillator 130 is electrically connected via sensing element 131 and leads 132 and 133 with the loop that includes coils 91 and 94, so as to respond to the central office operator initiated coin return command signal transmitted via that loop (for example −130VDC on lead 25) to generate an oscillatory tone $f_2'$ greater than $f_1$. In one example, a 2915Hz tone is transmitted via the hybrid 100, the elements 21, 16 and 15 and the hybrid 40 for detection at 70 and decoding at 71. This causes the coin return relay 73 to apply −130VDC to the tip lead 12 of the payphone, which in turn causes the coins to be returned to the customer.

The applique 22 also includes means such as elements 138 and 139, connected with the receive branch 120 (at the input side of the filter 122), as for example at 140, to detect signal tones transmitted from the carrier system. Elements 138 and 139 comprise a tone detector and a decoder and relay driver, respectively. In addition, a coin present relay 141 is connected with such means to be activated by a detected tone. The relay is connected with the primary hybrid via leads 143 and 132 to alter its impedance in response to relay activation. For example, it may switch a resistor 144 from the tip lead 25 to ground, thereby presenting coin "present" information or indication to the central office 20. Detector 138 detects signaling tones and provides appropriate DC outputs to correspond to the presence or absence of signaling tones. The decode network 139 decodes the DC levels from the detectors and provides the drive current to actuate the relay 141.

ORIGINATING CALL OPERATION

The customer lifts the handset 150 at 11, and upon depositing a proper coin at 151 a resistive ground is put on tip and a loop closure made at 11. A loop closure switch is indicated at 152. The loop closure is sensed at 63 and repeated at 163, which serves to turn on the carrier frequency in terminal block 15 and which is transmitted to the C.O. (Central Office) carrier channel via applique 22. The line relay in the carrier C.O. modem is closed which caused the C.O. line finder to seek out and connect the switching equipment to tip and ring leads 25 and 25a.

The coin deposit causes a resistive ground to be put upon the tip lead 12 which in turn turns on a 3000Hz oscillator at 62, the tone of which is transmitted to the carrier system. The tone modulates the carrier and is transmitted to applique 22 where it is sensed at 138 decoded at 139 and causes a 1.5K ohm resistor 144 to be connected from tip to ground at 141. The Central Office now senses both a coin present and loop closure.

The Central Office connects dial tone to tip and ring leads 25 and 25a and this is transmitted through the system to the paystation. Upon receipt of dial tone, the customer can dial the number he desires. If rotary dialing is used, the information is transmitted by making and breaking the loop current in leads 12 and 13. This information is transmitted by the system and repeated at leads 25 and 25a. If a touch-tone signalling unit is used, the tones are transmitted through the system to leads 25 and 25a. If the dialed number is a non-toll number, the switch gear will connect to the dialed number and test for a busy indication. In that event, a busy tone will be transmitted back to the paystation. Upon returning the transmitter to an On-Hook condition, the carrier system remains activated until the C.O. signals the paystation to return the coin, by applying −130VDC to the tip lead 25 which is sensed by the paystation applique 22. This turns on 2915Hz oscillator 130 which modulates the carrier system. The modulated signal is transmitted to the subscriber terminal at 15 where it is demodulated and transmitted to the paystation applique 14 sensed at 70, decoded at 71 and activates the coin return relay at 72. This causes −130VDC to be applied to the tip lead 12 to the payphone, thereby causing the coin to be returned to the customer.

Upon coin return, the paystation applique 14 no longer receives a coin present signal at 63, thereby causing the loop to be opened at 63 and allowing the carrier system to return an On-Hook signal to the C.O. via leads 25 and 25a. This in turn opens the loop at leads 24 and 24a and removes the resistative ground at the latter and allows the Central Office line finder equipment to disengage from the line.

For a completed call, the C.O. switchgear reverses the polarity of tip and ring at leads 25 and 25a. This is sensed by the C.O. and causes a momentary +130VDC to be applied to tip lead 25. The +130VDC is sensed at 131 and causes both a 2915 and a 3000Hz tone to be transmitted through the carrier system to applique 14. That tone is detected at 70 decoded at 71 and causes the coin collect relay at 72 to apply +130VDC to the tip lead 12. Such +130VDC activates the coin collect relay in the payphones.

If the customer dials a toll number, the C.O. switchgear makes a connection to a toll operator. The battery is reversed at 15 when the operator answers, thereby causing the −130VDC to be applied to the payphone tip lead as previously described and thereby returning the coin to the customer. When the operator dials the customer requested number, the customer is then informed of the toll charges due. These charges are then collected by credit card, reverse billing or by the customer depositing coins in the payphone. Such deposit returns audible signals to the operator, allowing tabulation of the deposited money. When the proper amount is deposited, the operator initiates a coin collect signal which causes +130VDC to be applied to the tip lead 25. This is sensed at 131 and turns on a 2915 and a 3000Hz oscillator at 130. Oscillator tones are transmitted to the subscriber applique 14, detected at 70 and decoded at 71. This causes the coin collect relay at 72 to apply +130VDC to the tip lead 12 thereby causing the payphone to transfer the coins to the coin box.

If for some reason the operator desires to return the coins to the customer, a coin return command is initiated which causes −130VDC to be applied to the tip lead 25. This is sensed at 131 and causes a 2915Hz oscillator to be turned on at 130, the tone of which is transmitted to applique 14, detected at 70 and decoded at 71. This causes the coin return relay at 73 to apply −130VDC to the tip lead 12 of the payphone, which in turn causes the coins to be returned to the customer. Whenever a call is completed successfully, the C.O. switchgear reverses the polarity at leads 25 and 25a. This reversal is sensed at 131 and causes a 3000Hz tone to be transmitted to the subscriber terminal. This tone is detected at 70 decoded at 71 and causes the reverse battery relay at 29 to reverse the tip and ring leads 12 and 13 to the payphone. Such battery reversal disables the touch tone pad in the case of touch tone phones, and also disables the nickel accumulator in applicable payphones.

TERMINATING CALL

On a terminating call, the C.O. switchgear tests the called line for a busy condition. If idle, tip and ring are connected to the C.O. switchgear at 3, the C.O. applies ringing voltage, which is typically 20 to 25Hz, 70 to 80VRMS, to the tip and ring leads 24 and 24a. This is passed through the C.O. paystation applique 22 to the carrier C.O. modem, where it modulates the carrier and is transmitted to the subscriber terminal and demodulated. This causes a 20 – 25Hz, 70 – 80VRMS signal to be applied to the tip and ring leads 12 and 13. Such voltage is sensed at 80, which causes a bypass relay to actuate, by passing the subscriber applique 14. The ringing voltage is then applied directly to the ringers in the payphone at 11. If no one answers, and the calling party hangs up, and ringing voltage is no longer applied at the payphone. If a party answers, the off-hook loop current is sensed at 63 repeated at 163, and turns on the carrier which causes the loop to be closed at leads 25 and 25a. This loop closure is sensed by the C.O. equipment at leads 24 and 24a and causes the ringing voltage to be removed.

Referring back to FIG. 1, elements 11, 15, 16, 21, 20 and 26 are known and examples are listed as follows:

| Element | Manufacturer and Model |
|---|---|
| 11 | Western Electric Ser. 1C1 and 1E1 or equivalent |
| 15 | Anaconda Model S6A or equivalent |
| 16 | Anaconda Model S6A or equivalent |
| 21 | Anaconda Model S6A or equivalent |
| 20 | Western Electric, Automatic Electric, North Electric, General Telephone and Electronics |
| 26 | Automatic Electric, Western Electric, North Electric |

I claim:

1. Applique circuitry for adapting a telephone system to operate with a paystation, comprising
   a. a first hybrid transformer connectible with said paystation,
   b. a second hybrid transformer connectible with the telephone system,
   c. a voice frequency transmit branch connected between certain coils of said first and second transformers, and including a first low pass filter to limit transmit voice frequencies to a selected band with an upper cut-off frequency $f_1$,
   d. a voice frequency receive branch connected between other coils of said first and second transformers and including a second low pass filter, and
   e. signaling circuitry connected between said first transformer and said voice frequency transmit branch at a location between said first filter and said second hybrid transformer to transmit signal tones above $f_1$.

2. The circuitry of claim 1 wherein the first transformer includes two loop connected coils respectively intercoupled with said certain and other coils of the first transformer, said signaling circuitry electrically connected with said two coils, and including said paystation connected with said two coils.

3. The circuitry of claim 2 wherein the second transformer includes two loop connected coils respectively intercoupled with said certain and other coils of the second transformer, and including said telephone system connected with said two loop connected coils of the second transformer.

4. The circuitry of claim 1 wherein said transmit branch includes a summing amplifier connected with the output side of the first filter and with the output of said signaling circuitry.

5. The circuitry of claim 1 wherein said signaling circuitry includes an oscillator electrically connected with said first hybrid and responsive to a coin deposit produced signal at the paystation to generate an oscillatory tone $f_2$ greater than $f_1$.

6. The circuitry of claim 1 including means connected with said receive branch at the input side of said second low-pass filter to detect signal tones transmitted from the telephone system, and coin collect and return relays operatively connected with said means to be selectively activated by predetermined different detected tone levels, said relays being selectively operable to supply predetermined voltage to a lead connectible with the paystation.

7. The circuitry of claim 6 wherein said means includes tone detector and decoder elements.

8. The circuitry of claim 7 including tip and ring leads connected between additional coils of said first hybrid transformer and a pair of terminals connectible with the paystation, a battery connected in series with and between said additional coils, a reversing relay connected between said leads and said terminals, and a connection between said tone decoder element and said reversing relay.

9. The circuitry of claim 1 including a ring detector operated by-pass relay electrically connected between the input side of said first hybrid transformer and the output side of said second hybrid transformer for by-passing said applique circuitry in response to ring signalling detection.

10. Central office circuitry for adapting a telephone system to operate with a paystation, comprising
    a. a primary hybrid transformer connectible with the central office to which a subscriber terminal is remotely connected,
    b. a secondary hybrid transformer connectible with a central office terminal to which the paystation is remotely connected,
    c. a voice frequency transmit branch connected between certain coils of said transformers, and including a primary low pass filter to limit transmit voice frequencies to a selected band with an upper cut-off frequency $f_1$,
    d. a voice frequency receive branch connected between other coils of said transformers and including a secondary low-pass filter, and
    e. signaling circuitry connected between said primary transformer and said voice frequency transmit branch at a location between the primary filter and the secondary transformer to transmit signal tones above $f_1$.

11. The circuitry of claim 10 including
    a. a first hybrid transformer connectible with said paystation,
    b. a second hybrid transformer electrically connected with said secondary hybrid transformer via said telephone system,
    c. a voice frequency transmit branch connected between certain coils of said first and second transformers, and including a first low pass filter to limit transmit voice frequencies to a selected band with an upper cut-off frequency $f_1$, d. a voice frequency receive branch connected between other coils of said first and second transformers and including a second low pass filter, and e. signaling circuitry connected between said first transformer and said first branch at a location between said first filter and said second hybrid transformer to transmit signal tones above $f_1$.

12. The circuitry of claim 10 wherein said transmit branch includes a summing amplifier connected with the output side of the primary filter and with the output of said signaling circuitry.

13. The circuitry of claim 10 wherein said signaling circuitry includes an oscillator electrically connected with the primary hybrid and responsive to a central office initiated coin return signal transmitted to the primary hybrid to generate an oscillatory signal $f_3$ greater than $f_1$.

14. The circuitry of claim 10 wherein said signaling circuitry includes an oscillator electrically connected with said primary hybrid and responsive to an operator initiated coin return command signal transmitted to the primary hybrid to generate an oscillatory tone $f_2$ greater than $f_1$.

15. The circuitry of claim 10 including means connected with the receive branch at the input side of the secondary low-pass filter to detect signal tones transmitted from the telephone system, and a coin present relay operatively connected with said means to be activated by a detected tone, said relay connected with said primary hybrid to alter the impedance thereof in response to said activation.

16. The circuitry of claim 15 wherein said means includes tone detector and decoder elements.

17. The circuitry of claim 1 wherein said telephone system is a subscriber carrier telephone system.

* * * * *